Patented Aug. 8, 1939

2,168,879

UNITED STATES PATENT OFFICE 2,168,879

PREPARATION OF STABLE CONCENTRATED SOLUTIONS OF THERAPEUTICALLY USEFUL CALCIUM COMPOUNDS

Richard Pasternack, Brooklyn, and Ellis V. Brown, Jamaica, N. Y., assignors to Charles Pfizer & Company, Brooklyn, N. Y., a corporation of New Jersey No Drawing. Original application June 20, 1938, Serial No. 220,330. Divided and this application March 14, 1939, Serial No. 261,770

4 Claims. (Cl. 167—68)

This invention relates to the preparation of therapeutically useful stable calcium solutions of high concentration, and is a division of our co-pending application Serial No. 220,330, filed June 20, 1938.

Calcium gluconate has been generally accepted by the medical profession as an effective and harmless compound for the administration of calcium either orally or intravenously. However, calcium gluconate is of relatively low solubility in water (approximately 3% at room temperature) whereas for many purposes solutions of 10%, 20% or higher are very desirable. Although such concentrations can be obtained at elevated temperatures and the solutions can sometimes be cooled without immediate precipitation they are not stable and are not practicable for injection purposes. Many attempts have been made to stabilize such solutions by various methods but so far as we have been able to discover most of these are of limited effectiveness and none are entirely reliable at very high concentrations.

We have now found that the product resulting from catalytic hydrogenation of calcium 5-keto-d-gluconate consists of a highly soluble mixture of therapeutically useful calcium salts, and moreover can be used to stabilize concentrated calcium gluconate solutions.

Neither 5-keto-gluconic acid nor its known derivatives are of great stability, so that it was impossible to predict the conditions under which it could be hydrogenated without serious decomposition. Moreover, the calcium salt is so nearly insoluble in water that it could not have been expected to react.

It was found experimentally that Ipatieff's conditions for the reduction of sugars, heating the reaction mixture at 130° C. under a pressure of about 100 atmospheres in the presence of a nickel catalyst, completely destroyed the calcium 5-keto-gluconate. It is known in the art that metals of the platinum group usually catalyze hydrogenation under conditions less severe than those required for nickel. The calcium 5-keto-gluconate was therefore subjected to treatment with hydrogen at room temperature under 100 atmospheres pressure and in the presence of a palladium catalyst, but no visible hydrogen absorption took place. The temperature was then raised to 100° C. in the course of several hours, but still without result.

We have found, however, that the nearly insoluble calcium 5-keto-gluconate may be successfully hydrogenated in aqueous suspension in the presence of a Raney nickel catalyst at a temperature of 25 to 70° C. with a hydrogen pressure of some 80 atmospheres or more, as disclosed in our above-mentioned application Serial No. 220,330. Inasmuch as the calcium 5-keto-gluconate and its reduction products are neutral substances, the nickel catalyst is unaffected and can be used repeatedly. For the same reason corrosion-resisting equipment is not necessary and reaction can be carried out in an ordinary iron autoclave. At pressures below 80 atmospheres, hydrogenation is rather slow at the comparatively low temperature used, but for the preparation of a pure product temperatures above 65° C. are not advisable because they cause decomposition. Considerably higher pressures may be used without harmful effect. At any pressure substantially above 80 atmospheres with an efficient nickel catalyst hydrogenation takes place at a practical rate at temperatures as low as 40° C., and even proceeds slowly at room temperature.

The hydrogenation product is a mixture of calcium-l-idonate and calcium d-gluconate. When the reaction temperature has been kept below 65° C., the solution of calcium salts resulting from the hydrogenation, after removal of the catalyst by filtration, is sufficiently pure for pharmaceutical use. Many efforts have been made to produce a therapeutically useful calcium salt mixture of high solubility, but with little success. It was therefore not to be expected that a natural mixture of calcium idonate and calcium gluconate resulting from the hydrogenation of calcium-5-keto-gluconate would serve the purpose. However, it was found that this product, an amorphous solid when dry, is so soluble in water that the concentration of its aqueous solutions is limited only by practical considerations such as viscosity.

*Example.*—240 grams of calcium 5-keto-gluconate containing three molecules of water of crystallization $(C_6H_9O_7)_2Ca.3H_2O$ are suspended in 1000 cc. of distilled water and treated with 35 g. of Rainey nickel catalyst. The suspension is placed in an autoclave and heated at 60° C. with agitation under a hydrogen pressure of 100 atmospheres. After some 4 hours heating, the absorption of hydrogen ceases. The pressure is then released and the solution filtered from the catalyst, which can be reused without further treatment. Boiling a sample of the filtrate with Fehling's solution shows the absence of reducing substances, indicating complete hydrogenation.

The colorless filtrate is evaporated to dryness either under vacuum or on a steam bath; or alternatively the solid product may be precipitated with alcohol.

In either case, the product is an amorphous mixture of calcium l-idonate and calcium d-gluconate. This mixture is not crystallizable. It is useful in calcium therapy, being non toxic and more soluble than any previously known calcium preparation. It is also possible to isolate from the mixture substantial amounts of l-idonic acid in pure form, for instance by the method used by van Ekenstein and de Bruyn (Rec. trav. 18:305, 1899). Dibenzal l-idonic acid of melting point 225° C. can be obtained from the hydrogenated mixture. Hydrolysis of the dibenzal compound by means of dilute sulfuric acid gives a solution of pure l-idonic acid.

The hydrogenation product forms a stable solution with any proportion of water, or it may be used to stabilize solutions already containing calcium gluconate. For example, if 100 grams of the dried hydrogenation mixture containing calcium idonate are added to an aqueous solution of 50 grams of calcium-d-gluconate in 600 cc. of water, the solution will remain stable. Such a solution obviously contains 20% of calcium aldonates, and since calcium idonate is an isomer of calcium gluconate the available calcium content is equivalent to that of a 20% solution of calcium gluconate.

More highly concentrated solutions of calcium gluconate may be stabilized by the addition of a larger proportion of calcium idonate, whether added as such or as a constituent of our hydrogenation product.

The invention claimed is:

1. Process of stabilizing an over-saturated aqueous solution of calcium gluconate which comprises adding to the solution calcium l-idonate.

2. Process of stabilizing an over-saturated solution of calcium gluconate which comprises adding to the calcium gluconate solution the calcium aldonate mixture resulting from the hydrogenation of calcium 5-keto-gluconate.

3. Process of preparing a therapeutically useful solution equivalent in calcium content to a 20% calcium gluconate solution, consisting in adding to a solution of calcium gluconate in 12 times its weight of water, twice its weight of the mixed calcium aldonates resulting from the hydrogenation of calcium 5-keto-gluconate.

4. Process of preparing a therapeutically useful solution equivalent in calcium content to a 50% calcium gluconate solution consisting in adding the dried mixture resulting from the catalytic hydrogenation of calcium-5-keto-d-gluconate to an equal weight of water.

RICHARD PASTERNACK.
ELLIS V. BROWN.